United States Patent
Caplain et al.

(10) Patent No.: US 7,255,353 B2
(45) Date of Patent: Aug. 14, 2007

(54) FLEXIBLE GRAPHITE SEALING JOINT WITH METAL JACKET FOR HIGH TEMPERATURE

(75) Inventors: Philippe Caplain, Saint Paul Trois Chateaux (FR); Christian Rouaud, Bourg Saint Andeol (FR); Patrick Le Gallo, Jarrie (FR); Fabienne Le Guyadec, Saint Paul Trois Chateaux (FR); Michel Lefrancois, Saint-Etienne (FR); Jean-Marie Gentzbittel, Seyssinet-Pariset (FR); Richard Levoy, Reauville (FR)

(73) Assignees: Commissariat a l'Energie Atomique, Paris (FR); Garlock France SAS, Saint-Etienne (FR)

( * ) Notice: Subject to any disclaimer, the term of this patent is extended or adjusted under 35 U.S.C. 154(b) by 284 days.

(21) Appl. No.: 10/516,299

(22) PCT Filed: Jun. 11, 2003

(86) PCT No.: PCT/FR03/01740

§ 371 (c)(1),
(2), (4) Date: Dec. 9, 2004

(87) PCT Pub. No.: WO03/106869

PCT Pub. Date: Dec. 24, 2003

(65) Prior Publication Data

US 2005/0225038 A1    Oct. 13, 2005

(30) Foreign Application Priority Data

Jun. 13, 2002 (FR) .................... 02 07260

(51) Int. Cl.
*F16J 15/08* (2006.01)

(52) U.S. Cl. ............ 277/627; 277/626; 277/539; 277/538

(58) Field of Classification Search .......... 277/627, 277/626, 602, 616, 936, 938, 538, 539
See application file for complete search history.

(56) References Cited

U.S. PATENT DOCUMENTS

| 2,249,981 | A | * | 7/1941 | Roe ..................... 277/537 |
| 3,481,824 | A | * | 12/1969 | Poltorak ................ 428/365 |
| 3,511,685 | A | * | 5/1970 | Rentschler ............ 427/322 |
| 4,298,207 | A | * | 11/1981 | Hopper et al. ........ 277/652 |
| 4,519,619 | A | * | 5/1985 | Doyle .................. 277/594 |
| 5,014,917 | A | * | 5/1991 | Sirocky et al. ..... 239/265.11 |
| 2001/0003389 | A1 | * | 6/2001 | Pippert ................ 277/627 |

FOREIGN PATENT DOCUMENTS

GB    2 069 631    8/1981

\* cited by examiner

*Primary Examiner*—William L. Miller
(74) *Attorney, Agent, or Firm*—Oblon, Spivak, McClelland, Maier & Neustadt, P.C.

(57) ABSTRACT

The seal can be used at high temperature. It is composed of a central flexible graphite core (10) maintained in its shape by two metal cups (12) that do not touch. It is all surrounded by a tight sheath (15) enabling the flexible core (10) to be maintained in a neutral atmosphere such as a partial vacuum or a neutral gas.

8 Claims, 3 Drawing Sheets

FLEXIBLE GRAPHITE SEALING JOINT WITH METAL JACKET FOR HIGH TEMPERATURE

SCOPE OF THE INVENTION

The invention relates to the field of static tightness, particularly for pipe flanges likely to convey fluids at very high temperatures.

PREVIOUS TECHNOLOGY AND PROBLEM POSED

With reference to FIGS. 1, 2, 3, 4 and 5, several types of seal are known that use several materials such as metal and graphite.

Figure 5:
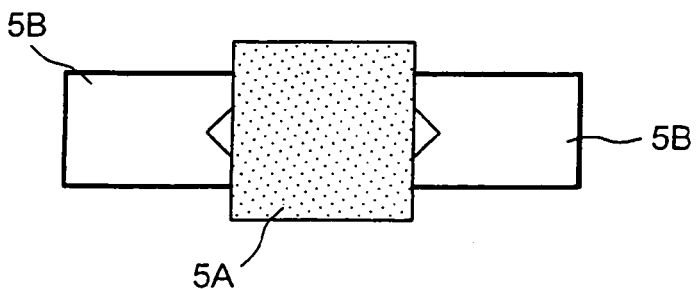

Finally, an all graphite type of seal is represented in FIG. 5, where a central core 5A is a square or rectangular section and is wrapped on each side by two massive metal rings 5B.

In all these types of metalloplastic seals, the asbestos has gradually given way to flexible graphite, also called expanded graphite. This is used directly as a sealing material such that it is in direct contact with the components between which the seal must be provided, i.e. flanges. This is the case, for example, with spiral, wavy, and fluted seals with a lining. It is also indirectly used as a lining element, particularly with metalloplastic seals.

Replacing the asbestos with the graphite has nevertheless not solved a problem relating to the variety of performance levels observed with these composite seals, i.e. in connecting graphite and metal. This is why, in very difficult applications, the all graphite seal very quickly dominated because not only does it show a high reproducibility of performance, but it also allows metal/metal contact between the flanges on the rings that demarcate the volume occupied by the graphite.

The limits of use of these new matrixed graphite seals are therefore closely linked to those of the material itself i.e. the flexible graphite. However, the essential parameter characterising the expanded graphite is its level of purity i.e. its maximum ash content. The risk of corrosion and speed of oxidation are therefore linked to this purity factor so that a limit temperature of 550° C. is widely accepted for the purest graphites in the presence of oxygen.

The aim of the invention is to remedy this drawback by proposing a different type of seal using graphite and metal and able to resist temperatures higher than 550° C.

SUMMARY OF THE INVENTION

For this purpose, the main object of the invention is a seal in flexible graphite with a metal envelope for high temperatures, consisting among other things of a flexible graphite core and a metal envelope surrounding the flexible core.

According to the invention, this unit composed of a flexible core surrounded by a metal envelope is itself enclosed in a hermetically sealed sheath, so that this closed unit can work in a controlled atmosphere. In fact it has been noted that, in an inert atmosphere, i.e. without oxygen, the functioning temperature of the graphite can climb to 2,000° C. without changing its physical properties. In addition, the metal envelope is benefited by being produced in two cups that do not completely surround the flexible core.

For this reason an initial implementation of the invention provides for imposing a partial vacuum inside the sheath.

Another possible implementation provides for putting a neutral gas inside the sheath.

Flexible graphite is preferably used to constitute the flexible core.

In the main implementation the sheath is meant to be of metal.

As far as its shape is concerned, the sheath can, when initially implemented, be in two welded parts in a mid plane of the seal.

In a second implementation, the sheath can be produced, still in two parts, with the welds on opposed edges, when the sheath section is quadrilateral.

Finally, a third implementation of the sheath provides that it is in four parts, two lateral, one higher, one lower, all welded together.

The sheath will preferably be a square or rectangular section.

It is a good idea to make sure that the cups have projections on the sides where the sheath must be under load when the seal is tightened.

LIST OF FIGURES

The invention and its different technical features will be better understood on reading the following description accompanied by several figures of which the first have already been described.

Figure 1:
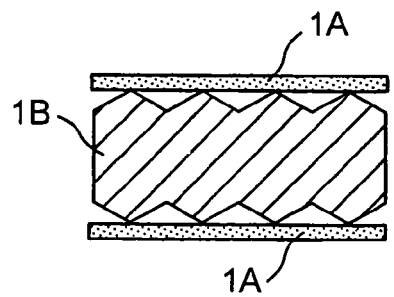
FIG. 1 shows a fluted type of seal, where a metallic core 1B is surrounded by two thin layers of graphite 1A. The metallic core 1B has flutes on its surface so that the graphite layers 1A can penetrate slightly into the metallic core 1B so as to result in the tightening of the joint.
Figure 2:
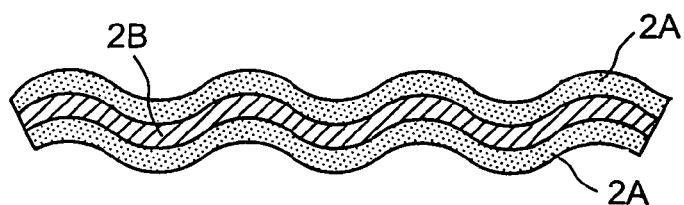
FIG. 2 shows a wavy type of seal, where a central metal layer 2B with a wavy shape is covered on its two surfaces by a graphite layer 2A, also adopting the wavy shape.
Figure 3:
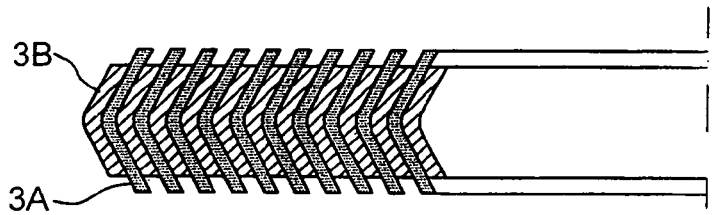
FIG. 3 shows a spiralled type of seal, where a graphite spiral 3A is wrapped together with a metal spiral 3B.
Figure 4:
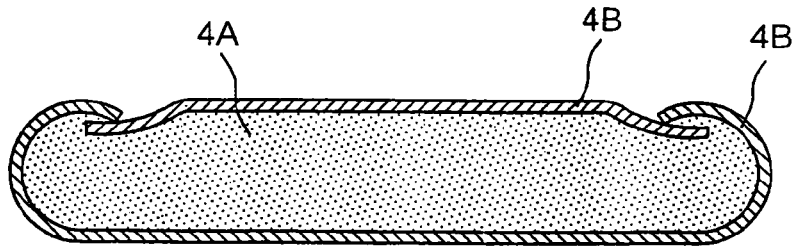
FIG. 4 shows a metalloplastic type of seal, where the central core 4A is graphite and is wrapped in a metal envelope 4B, in two parts.
Figure 6:
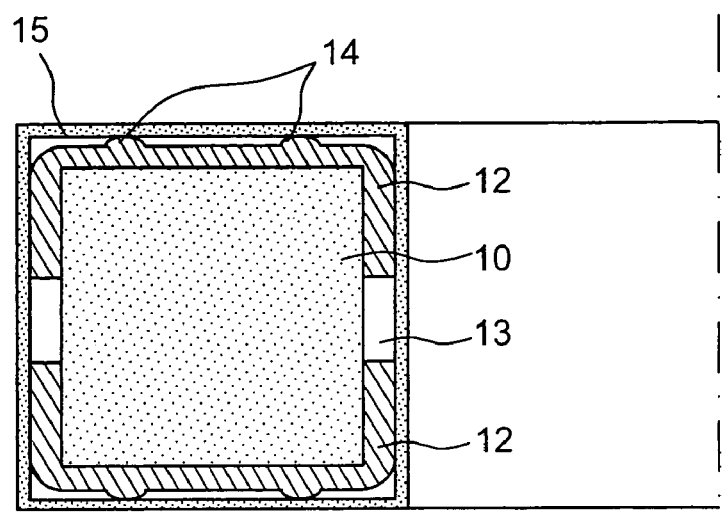
Figure 7:
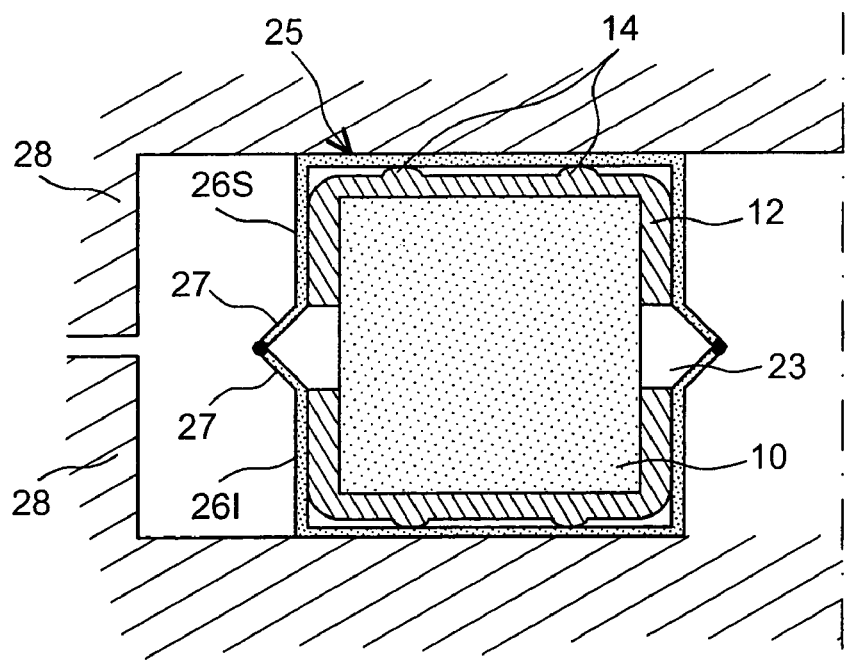
Figure 8:
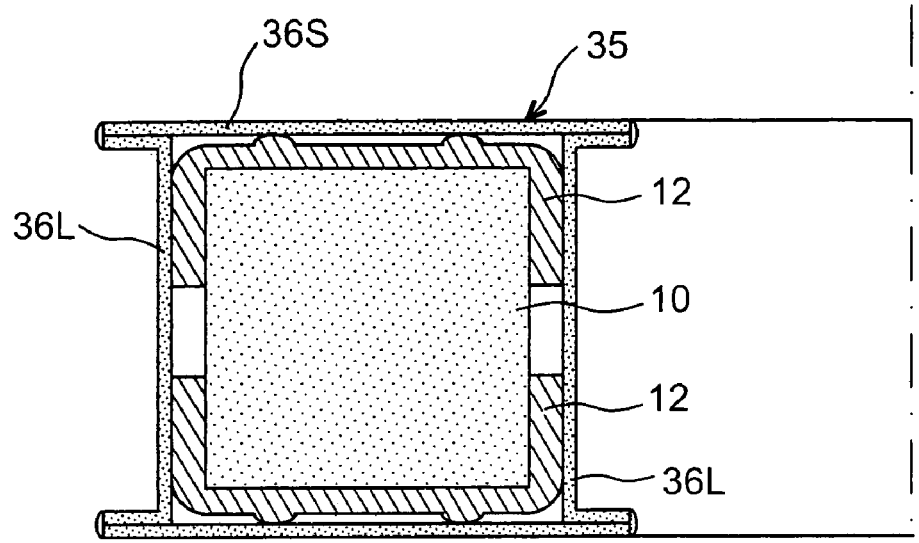
Figure 9:
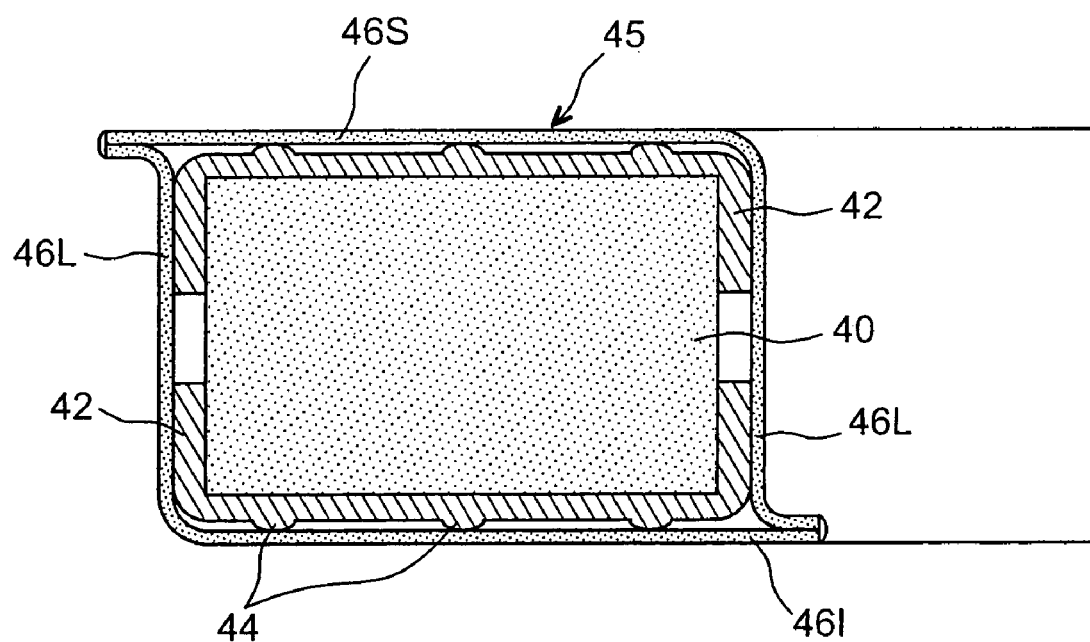

These figures represent respectively:

FIG. 1 depicts a first type of fluted seal, using the previous technology;

FIG. 2 depicts a second type of wavy seal, using the previous technology;

FIG. 3 depicts a third type of spiralled seal, using the previous technology;

FIG. 4 depicts a fourth type of metalloplastic seal, using the previous technology;

FIG. 5 depicts a fifth type of all graphite seal, using the previous technology;

FIG. 6 depicts a first implementation of the seal according to the invention;

FIG. 7 depicts a second implementation of the seal according to the invention;

FIG. 8 depicts a third implementation of the seal according to the invention;

FIG. 9 depicts a fourth implementation of the seal according to the invention.

DETAILED DESCRIPTION OF FOUR IMPLEMENTATIONS OF THE INVENTION

With reference to FIG. 6, the seal according to the invention is therefore a composite seal linking a flexible internal core 10, composed of expanded graphite or a material that is roughly equivalent. It is specified that, to preserve its elastic properties beyond 550° C. the expanded graphite must be maintained in an atmosphere free of oxygen. This is why, according to the invention, an hermetically sealed sheath 15 is produced, so as to prevent any migration of corrosive gas towards the graphite. It is anticipated that it may be possible to extract oxygen if necessary and replace it by a neutral gas like argon for example.

Thus the sheath 15 constitutes a metal box that obstructs any transfer of gas from the outside of this box thus constituted towards the inside, and vice versa. The flexible core 10 in expanded graphite is conditioned between the two metal cups 12 constituting the metal envelope, the volume of this core being thus demarcated to prevent any extrusion of the graphite, during its densification while being compressed during the tightening phase. It is noted that a space 13 exists between these two cups 12 before tightening and that it is reduced to a minimum at the end of tightening.

The cups 12 have on their surfaces opposite the part of the sheath 15 that must receive the parts between which the seal must be established, several projections 14. This in fact enables a concentration of effort to be provided at the level of contact between the seal and the raised face i.e. the part to be sealed. This contributes to maintaining the seal. These projections 14 are represented in the form of rounded bosses but can also be triangular and rectangular. Their height is dimensioned so as to prevent shearing of the sheath 15 during the functioning of the sheath at high temperature.

The metal envelope constituted by the cups 12 is a lot more rigid than the sheath 15 that is also metal. When the seal is being crushed, i.e. when the two parts between which the seal must be provided are brought together, the flexible graphite of the core 10 reduces in volume by densifying and therefore exerts an increasing global reaction on the envelope 15. This global reaction is concentrated on the projections 14 formed outside the two cups 12.

FIG. 7 presents a second implementation of the seal according to the invention, this being a little more complete. In fact, the sheath 25 is composed of two distinct parts, a higher 26S and lower 26I part. These two parts are welded in a mid plane by their respective ends 27 which project outwards creating flexible lips, facilitating the implementation of welding and also making the sheath 25 more flexible when the seal is being compressed. The flexible core 10 and the cups 12 constituting the metal envelope are identical to the preceding described in FIG. 6.

The third implementation represented on FIG. 8 shows that the sheath 35 can be composed of four parts: a higher part 36S, a lower part 36I and two lateral parts 36L. These four parts are welded two by two in two planes of internal walls of the higher 36S and lower 36I parts. The flexible core 10 and the cups 12 can have the same shapes as for the previous implementations.

The fourth implementation represented by FIG. 9 has a flexible core 40 which is no longer square but rectangular. This results in the cups 42 being a little wider and having a larger number of projections 44. In contrast, the sheath 45 is in two parts, a higher 46S and a lower 46I each with a vertical side 46L. Their weldings are therefore provided on opposite edges of the rectangular shape of the unit.

As a result of their application, the materials used to constitute the metal sheath and the cups are therefore chosen according to their temperature resistance and their mechanical resistance to heat. The sheath should preferably be a nickel or iron-based alloy because these materials are capable of forming a protective layer against corrosion at high temperature which can be composed of aluminium oxide or a chromium oxide. The material composing the cups is more limited in choice since it is protected from corrosion by the sheath. Nickel/chrome/iron alloys which are commonly used, can be used. Other materials, like ceramic can also be used for reuse or lifecycle purposes.

As a dimensional example, for a seal with an average diameter of 50 to 150 mm a section of graphite of 5×5 mm, linked with cups of 0.5 mm in thickness can be used. The thickness of the sheath must be voluntarily limited to 0.10 or 0.20 mm and in this case the height of the projections is 0.05 or 0.15 mm respectively.

It can be thus be understood that, once closed, the graphite core can preserve its effective properties at high temperature once it is enclosed in the sheath that surrounds it.

The invention claimed is:

1. A seal, comprising:
   a flexible core including flexible graphite;
   a metal envelope that surrounds the flexible core; and
   a sheath that is hermetically sealed, inside of which is placed a unit including the metal envelope and the flexible core, wherein
   the sheath includes two parts welded in a mid plane of the seal, and
   the metal envelope includes two cups not completely surrounding the flexible core.

2. The seal according to claim 1, wherein the inside of the sheath is maintained in a relative vacuum.

3. The seal according to claim 1, wherein the inside of the sheath is maintained in neutral gas.

4. The seal according to claim 1, wherein the sheath is metallic.

5. A seal, comprising:
   a flexible core including flexible graphite;
   a metal envelope that surrounds the flexible core; and
   a sheath that is hermetically sealed, inside of which is placed a unit including the metal envelope and the flexible core, wherein
   the metal envelope includes two cups not completely surrounding the flexible core, and
   the sheath includes a higher part and a lower part welded at a level of two opposite edges of a quadrilateral formed by the seal.

6. The seal according to claim 1, wherein the seal is a square section.

7. The seal according to claim 1, wherein the seal is a rectangular section.

8. The seal according to claim 7, wherein the cups have projections located at a side where the sheath is under a load.

* * * * *